3,167,517
DYEING ASSISTANT AND LEVELING COMPOSITIONS

Henry E. Millson, Plainfield, and James Dammicci, Raritan, N.J., assignors to American Cyanamid Company, New York, N.Y., a corporation of Maine
No Drawing. Filed Aug. 11, 1960, Ser. No. 48,857
6 Claims. (Cl. 252—353)

The present invention relates to a novel process for coloring nitrogenous materials at a pH of from about four to about six with available anionic dyes which previously could not be so utilized. More particularly, it is concerned with a process for coloring natural and synthetic nitrogenous fibrous materials.

Still more specifically, the invention also presents novel dyeing assistants which enable such nitrogen-containing materials to be colored with the desired dyestuffs and which at the desired pH range prevent such dyes from striking and exhausting too rapidly. Resultant dyeings are characterized by excellent strong, level, shades. They exhibit no physical damage to the material.

In general, the present invention may be used to color nitrogenous materials in various physical forms. These include, for example, sheets, films, rods, tubes, bristles and the like. However, its most commonly encountered applications are in the dyeing of fibers, yarns and fabrics. Therefore, these fibrous structures will be taken as illustrative herein. For purposes of simplifying their identification, they will be referred to generally as "nitrogenous fibers." However, it will be understood that this term is intended to include the various physical forms noted above.

As contemplated by the present invention, the term "nitrogenous fibers" includes both natural and synthetic materials, most of the latter being organic, hydrophobic materials. These fibers may be classified generally into two broad groups as (A) proteins and as (B) synthetics. As used in this discussion, Group (A) includes both natural and synthetic proteins, and Group (B) includes various types of synthetic, organic, nitrogen-containing, polymeric fibers derived from a polymerizable mixture containing at least 5% of a "basic nitrogen" modifier.

The first and older group, Group (A) is often more precisely defined as a basic, nitrogen containing group, i.e., as materials wherein the nitrogen is present in a basic form. This class includes natural protein fibers such as wool, mohair, fur, hair, alpaca, real silk, tussah silk and the like. It also includes synthetic protein fibers such as those derived from corn, peanuts, milk and the like. The natural fibers of Group (A) are referred to below as Type (1); the synthetics as Type (2).

In recent years, industry has developed a large number of varied synthetic fibers, each having desirable properties. Some of these comprise Group (B) of this invention. It includes various super-polyamides, known generally in the trade as nylons. These are referred to below as Type (3). Others include those often called "acrylic" fibers, since many are polymers or copolymers of acrylonitrile. These include such typical illustrative copolymers as those of acrylonitrile and vinyl pyridine; acrylonitrile, vinyl acetate and vinyl pyridine; combinations of these copolymers; and acrylonitrile fibers wet spun from concentrated aqueous thiocyanate solutions. Materials of this general class are referred to below as Type (4). Another group is often referred to in the trade as "modified" acrylics. These will be referred to herein as Type (5). This type is illustrated, for example, by such copolymers such as those of acrylonitrile and vinyl pyrrolidone; acrylonitrile, vinylidene chloride and polyvinyl pyrrolidone; and the like.

Despite the varied, but advantageous, properties of these natural and synthetic fibers, in the past there has been available no satisfactory process by which they can be colored with some types of conventional dyes at a pH in the range of from about four to about six. This problem has proved particularly troublesome with respect to the synthetics of Group (B) which in general are the most difficult to dye. It is especially aggravated in the case of certain acrylic copolymers, .ie., those basic copolymers which comprise at least 70% by weight of polymerized acrylonitrile and also contain at least one copolymerized "basic" comonomer.

TYPES OF DYESTUFFS UTILIZED

One of the primary purposes of this invention is to provide a process by which nitrogenous fibers such as those of Types (1) to (5) can be satisfactorily colored at a pH of from about four to about six, making use of certain types of dyestuffs which previously could not be satisfactorily employed at this pH range. To this end, it is contemplated that this invention may utilize a wide selection among certain specific types of presently-available dyestuffs.

Those types of commercially-available dyes, suitable for use in coloring the fibers of Types (1)–(5) in accordance with the present invention may be classified in various ways. In general, they fall into three groups which are commercially characterized as (a) "milling" dyes, (b) "premetallized" dyes of the neutral-dyeing type, and (c) "disperse" dyes. All three fall within the general class of anionic dyes in which color is imparted by the negatively-charged portion of the molecule.

Milling dyes as a class generally comprise certain acid dyes which have excellent wet fastness properties when properly applied. For best results, they require careful application from a dye-bath having a pH of about six to eight. They will be referred to below as Type (A).

The neutral-dyeing premetallized dyes differ as a class from the older "acid-dyeing" type which dye levelly at a pH of about four to six. The latter contain sulfonic acid groups or alkali-metal salts thereof. In the "neutral-dyeing" type with which this invention is concerned, the sulfonic groupings have been converted to some modified grouping such, for example, as the sulfonamides. This change in the molecular structure also modifies the dyeing characteristics. Unlike the acid-dyeing type, they will not dye levelly at the usual acid-dyeing pH range of about four to six. For optimum results, using this type the dye bath also must have a pH of about six to eight. This type is referred to below as Type (B).

Disperse dyes as referred to in the present invention are "water-insoluble" dyes, differing in this respect from Types (A) and (B). They dye from a dispersion of the dye in an aqueous bath. However, like the dyes of Types (A) and (B), in the past it has only been possible to obtain the optimum results when the dye-bath has a pH of from about six to about eight. These dyes are referred to herein as Type (C).

COLORING REQUIREMENTS

Coloring of fibrous materials encompasses, among others, at least two critical requisites. The first comprises removal of dye from an aqueous bath and depositing it upon the fiber. The amount deposited in the early stages of the dyeing is termed the "strike." It is related to the attraction of the dye for the fiber. When two or more dyes are present, the dye first sorbed, or sorbed to the greater extent, by the fiber is that having the higher attraction, i.e., "strike." Obviously, the greater the attraction between dye and fiber, the more rapid is the transfer of dye from the bath to the fiber.

The second requisite is the production of uniform sorption of dye by the fiber. Otherwise, a "heathery," "skittery," "streaked" or "blotched" appearance is imparted to the material. Ordinarily, however, obtaining uniform "sorption" connotes a lower attraction or lower strike.

Unfortunately, therefore, these two features present conflicting problems. It is always desirable to reduce the time period required in dyeing and still exhaust the dye bath. This is favored by greater attraction and more rapid sorption of the dye. But, conversely, production of a level dyeing of a good solid shade is favored when dyes are sorbed more slowly and have a lower attraction for the fiber so that they can dye "off-and-on."

Dyes of the above-noted types (A), (B) and (C), contemplated in this invention, are well known to be "substantive" dyes, i.e., to exhibit tremendous fiber attraction, particularly for fibers containing basic-nitrogen groups of the types described above. Dyers have long known that to obtain good exhaustion of these dye-types from the dye bath, with minimized waste of an expensive dye, optimum conditions are obtained when the dye bath is at about the boil and also is acidic, of the order of pH 4–6.

Unfortunately, these conditions favor a strong "strike," often resulting in unlevel dyeings which are not commerically acceptable. Accordingly, to prevent this he is forced to raise the pH of the bath to 6–8, and to lower the dyeing temperature. This results in much longer dyeing cycle with its concomitant increase in commercial expense and in waste of dye which also adds to the overall cost.

A third feature in obtaining good dyeing, although perhaps less critical, is the desirability of obtaining a maximum penetration of the dye into the fiber. Complete penetration is not always possible and may or may not occur during a particular dyeing cycle. When obtainable, it appreciably adds to the quality of a dyeing and results in maximum fastness of the dyed material. This third feature also conflicts with the first, since a dye having high affinity for a fiber is likely to concentrate on the fiber surface and has less tendency or chance of migrating to the interior.

Although the primary purpose of a process in accordance with this invention is to obtain better dyeing of fibers of Types (1) to (5), using dyes of Types (A), (B) and (C) at the optimum acidic and temperature conditions, it should be noted that to the considered successful, such a process also must meet certain additional criteria. For example, these would include: permitting (a) rapid strike while (b) obtaining uniform distribution of dye and (c) good exhaust; (d) level dyeing of material which had been unevenly scoured; (e) level dyeing of different fiber types used in the manufacture of blended yarns; (f) level dyeing of "hard" and "soft" yarns which have been used side by side in the weaving operation; (g) level dyeing of synthetic fibers which had been non-uniformly spun during manufacture, which causes uneven dyeing characteristics to be imparted to the fibers; and (h) level dyeing of "piece material" which had received uneven tensions during the weaving operation.

It is also important that the process shall avoid physical damage to the fibers. This is especially true too with respect to Group (B). It must not remove the vital "crimp" which is imparted to such fibers during their manufacture to provide the elasticity or extensibility which is an absolute requirement in throwing and weaving operations and in the subsequent use of the fabric. Without this extensibility, the fiber, yarn or fabric is void of the "life" which the consumer demands. Consequently, an important step in the manufacture of most synthetic nitrogenous textile fibers is the "crimping" operation. It is not sufficient merely to put this crimp in. The dyeing process must not remove it.

In view of the commercial importance of the fibers of Type (1) through (5) and of the contemplated dyestuffs, there has been a long-standing need for a satisfactory dyeing procedure. Such a process for dyeing the presently contemplated fibers with the desired dyes at optimum conditions of acidity and temperature has not been available. A number of dyeing assistants to overcome the problem have been proposed. None have proved to be as satisfactory as the dyer needs.

Surprisingly, in view of the demand for such a process, and previous lack of success in providing it, according to this invention it has been found.

Even more surprising is the fact that despite the long-felt need for such a process, it now has been provided in the present invention and to a surprisingly successful degree. It provides a relatively simple dyeing process for nitrogenous fibers of both Groups (A) and (B). It produces a controlled strike; strong, level shades; surprisingly good penetration of the fiber by the dye; and the dye bath is satisfactorily exhausted. Excellent dyeings at the desired conditions are easily obtained in shorter dyeing times. Last, but not least, no observable damage to the fibers is produced.

In general terms, the improved dyeing process of this invention may be simply described. The fibers, in general, are dyed by the same operative steps employed in dyeing at the desired acidic and temperature conditions which were previously used with some acid dyes but could not be satisfactorily employed with the types of acid dyes with which the present invention is concerned. However, the procedure is modified by use in the dye bath of a novel type of dyeing-assistant composition.

In these broad terms, however, the modification seems more simple than is actually the case. The composition must be prepared in a quite specific manner. Moreover, the selection of components is critical, as is also, within certain limits, their relative proportions. The selection of components will be considered first.

The novel composition of this invention must contain at least two non-ionic surfactants, each of a specific type; and also at least one anionic surfactant of a specific type. All of the surfactants which are employed are of known types. In each case a number of such surface-active agents are readily available under a variety of commercial designations. It is their combination and the method of combining them which is responsible for the unexpected success of this invention.

One of the non-ionic types, must be of the alkyl aryl polyester alcohol type. These are commercially-available products obtained by condensing about one mol of an alkyl phenol with from about six to about ten mols of ethylene oxide. The alkyl moiety of the phenol should be a medium length chain of about six to ten carbon atoms. A typical illustrative product is that obtained by condensing one mol of nonyl phenol with nine mols of ethylene oxide. This first type of nonionic agent is referred to below as the (N–1) component for purposes of simplifying its identification.

The second type of nonionic surface-active agent should be a mixed polyoxypropylene-polyoxyethylene product, containing from about three to about five parts by weight of the polyoxyethylene to one part by weight of the polyoxypropylene. A typical illustrative product is the condensation product of about four parts by weight of polyoxyethylene with one part by weight of polyoxypropylene, the polyoxypropylene having a molecular weight of about 1500–1800 and the polyoxyethylene-polyoxypropylene condensation product having a molecular weight of about 8,000–9,000. For purposes of identification, this type is referred to herein as the (N–2) or as the polyoxyalkylene component.

The anionic-type agent should be a sulfonated naphthalene, usually neutralized. The naphthalene moiety may, and usually will, have alkyl substituents. Usually the alkyl group will contain some four to eight carbon atoms. A typical illustrative example of an agent of this type is a mixed amyl-naphthalene sodium sulfonate in which the naphthalenes contain one, two or three amyl groups. For identification, this type is referred to below as the (A-1) or as the sulfonated naphthalene component.

In the compositions of this invention, the weight ratio of the (N-1) to the (N-2) type may vary from about 2:1 down to about 0.35:1. However, a ratio in the range of from about 1:1 down to about 0.4:1 is generally preferred. Its use will constitute a good practice. The combined weight of the non-ionic components present will indicate the amount of the (A-1) component to be used. The weight ratio of the combined weight of the non-ionic components to that of the anionic components may vary from as high as about 1.5:1 down to about 10:1.

When the dyeing assistant is added to the dye bath it is necessarily diluted. Theoretically, then, there is no upper limit on water content. Practically, however, this is unfeasible. The minimum total non-ionic content should be about eight weight percent and the maximum about sixty. Moreover, within the minimum 8% limit, neither of the required non-ionic agents should be present in amount less than about 2.7% nor more than about 40% within these limits, and observing the above-noted ratio limits, the range between minimum and maximum weight percent limits for some of the components is shown in the following Table I.

*Table I*

| Component | | Weight Percent | |
|---|---|---|---|
| Item | Type | Minimum | Maximum |
| (1) | (N-1) | 2.7 | 40 |
| (2) | (N-2) | 2.7 | 40 |
| (3) | (1)+(2) (total) | 8 | 60 |
| (4) | (A-1) | 0.8 | |
| (5) | (3)+(4) (total) | 8.8 | |
| (6) | Water | | 91.2 |

In this Table I, no minimum can be given for water nor any maximum for (A-1), or for Item (5), i.e., (N-1)+(N-2)+(A-1), there are several reasons therefor.

It was noted above that the permissible maximum Item (3) is 60%. On the basis of the maximum weight ratio of non-ionics to (A-1), i.e., 1.5:1, some 40% of (A-1) could be present, corresponding to a zero water content. This points up the fact that in Table I only the outside limits for any one "Item" are shown. The maximum contents and maximum ratios for all the "Items" can not be employed in making up any one composition. Their minimum water content limit is about 23%. On this basis, and using the various ratios which constitute the preferred, rather than the outside limits, the compositions generally encountered will have contents within the ranges shown in the following Table II. Therein, also the content of a typical composition such as will be discussed below in the illustrative examples also has been shown.

*Table II*

| Component | | Weight Percent | | |
|---|---|---|---|---|
| Item | Type | Min. | Max. | Typical |
| (1) | (N-1) | 10 | 30 | 25 |
| (2) | (N-2) | 10 | 30 | 25 |
| (3) | (1)+(2) | 35 | 50 | 50 |
| (4) | (A-1) | 5 | 25 | 6.25 |
| (5) | (3)+(4) | 40 | 75 | 56.25 |
| (6) | Water | 23 | 55 | 43.75 |

Just why a dyeing assistant composition of this type should cause the anionic dyes of Types (A), (B) or (C) to exhaust from the dye bath giving strong, level shades free from heathery or skittery effects, to penetrate the fiber, thereby improving the fastness properties; to permit the color to dye "off-and-on," is not understood.

The amount of dyeing-assistant which should be used in the dye bath in a typical mill dyeing schedule will vary somewhat with the dye, the liquor ratio and the fibers involved. In general terms, using as illustrative the average composition of Table II, above, from about 0.25 to about four weight percent (OWF) will be used in the dye bath. Ordinarily, from about 0.5 to about 1.5 percent constitutes a good practice and is generally preferred. Equivalent amounts of the composition having other concentrations may be used. Good results are obtained when the assistant is added to the dye bath. However, prewetting the fibers before dyeing with a dilute solution of the dyeing assistant is preferred.

As was noted above, a critical feature of the novel dyeing assistant of this invention is in the method by which it is prepared. Otherwise, a uniform, liquid composition is not obtained. A typical preparation of an illustrative composition is carried out as follows:

(1) Dissolve the (N-2) component in all the water, usually at the ambient temperature.
(2) Add the A-1 and the N-1 components and heat the mixture with stirring to about 160°–195° F., preferably to an average of about 180° to 185° F.
(3) Add mixture (2) to solution (1) slowly, with stirring, then heat to the boil while continuing the stirring.
(4) Continue the stirring at the boil until the solution becomes uniform in appearance.
(5) Discontinue the heating.
(6) Continue stirring slowly as the mixture cools until it reaches about room temperature.

It is highly important that the cooling mixture be slowly stirred during the progress of Step (6). Otherwise, after cooling is completed, the composition will not be uniform. The completed, cooled composition is a clear amber liquid having a pH of about 7. It is slightly thixotropic, but is easily liquified by stirring.

Although various dyeing cycles may be used for various reasons, a typical dyeing procedure using the fluid dyeing assistant of the present invention may be outlined in the following steps:

(1) Add to the dyeing machine the normal amount of water.
(2) Add about one percent (OWF) of the dyeing assistant in one to two gallons of cold water and add to the dyeing machine.
(3) Enter the material to be dyed and wet it out for about ten minutes (or until thoroughly wet) with the dyeing assistant solution.
(4) Add the selected dye in amount of about 0.125 to about 4.0 percent (OWF) (depending on shade to be obtained) to water and add to the liquor in the dyeing machine.
(5) Dissolve about 3% ammonium acetate (OWF) in water and add to the dye liquor.
(6) While running the goods in the machine, turn on the heat and raise to the boil over some 30–60 minutes, usually about 45.
(7) Dye at the boil for about an equal period of time, or until dyeing is completed.
(8) Remove the excess dye liquor from the dyed material in the usual manner as by rinsing and/or washing and drying.

For dyes that are more difficult to exhaust, after Step (7) some 0.5 to about 1.0 percent (OWF) of aqueous acetic acid (28%) or its equivalent may be added to the dye bath and the boiling continued for an additional period of some thirty minutes. This is then followed by Step (8) above.

As an alternative in Step (5), the ammonium acetate may be replaced by the 0.5–1.0 percent of the 28% aqueous acetic acid or its equivalent. This procedure lowers the pH of the dye bath more than the addition of ammonium acetate. In turn, this usually reduces the length of time necessary to complete the dyeing. In the past, this usually was not a good practice. However, in the present invention, it may be done safely without danger of uneven strikes and commercially unacceptable dyeings.

It is a further advantage of the present invention that neutral-dyeing, anionic dyes may be applied by the above process to natural or synthetic material in the form of raw stock, yarns or fabrics.

The present invention will be further developed in conjunction with the following more specific discussion and the accompanying illustrative examples. Therein, unless otherwise noted, all parts and percentages are by weight and all temperatures are in degrees Fahrenheit. Concentration percentages in the bath are based on the weight of the fiber (OWF), unless otherwise noted.

In the following discussion and examples, certain specific fibers of Group (B) are tested as illustrative examples. For purposes of identification, they have been designated as Fibers A, B, C, D and E, respectively. These designations are used to identify fibers having the following compositions.

Fiber A is a commercially-available, polyamide fiber of Type (3) derived from hexamethylene diamine and adipic acid.

Fiber B is a commercially-available, self-condensation fiber of Type (3) derived from 6-aminohexanoic acid.

Fiber C is a commercially-available, acrylic copolymer of Type (4) derived from a mixture containing about 85% acrylonitrile and about 7.5% of each of vinyl acetate and monovinyl pyridine.

Fiber D is a commercially-available, acrylic copolymer of Type (4) derived from a mixture containing about 89% acrylonitrile and about 5.5% each of vinyl acetate and monovinyl pyridine.

Fiber E is a commercially-available modified-acrylic fiber of Type (5) derived from a mixture containing about 85% acrylonitrile and about 15% vinyl pyrrolidone.

It is to be understood these five test fibers were selected merely for purposes of illustration of Types (3), (4) and (5) and that the process of the present invention is not necessarily limited to dyeing these specific fibers.

To illustrate the results obtained in attempting dyeing with dyes of Types (A) (B) and (C) but without the dyeing assistants of this invention at a pH below six in the acid-dyeing procedure outlined above, the following Examples 1–4 are given. They are intended only for purposes of comparison.

EXAMPLE 1

A 250 ml. dye bath is prepared containing 250 ml. water, 50 mg. Acid Red 182 (1% OWF) and 150 mg. ammonium acetate (3% OWF) The dye is added to part of the water and then to the bath. The ammonium acetate is also dissolved in part of the water and added to the dye bath. A sample 5-gram wool piece is then prewet with water, the excess water removed by passing the wet piece through a pair of squeeze rolls, and the wet piece is entered into the dye bath at room temperature. The ratio of the dye bath to wool is 50–1. The initial pH of the dye bath is about 6.1. The dye bath is slowly heated and the piece of wool is stirred. By the time the temperature has reached about 160° F. substantially all the dye is exhausted. Heating and stirring are continued until the dye bath reaches the boil in about 45 minutes, and for about 45 more minutes at the boil. The dyed piece is then rinsed, washed and dried. The pH of the dye bath is then about 5.7. The piece is dyed unevenly, has a heathery appearance and the dyeing is commercially unacceptable.

EXAMPLE 2

The procedure of Example 1 is repeated using a 5-gram piece comprising Fiber A, the piece containing structural defects. Again the dye from the bath is substantially exhausted by the time the bath temperature has reached 160° F. The dyed piece shows unevenly dyed portions (Barré marks) and is commercially unacceptable.

EXAMPLE 3

Six dye baths are prepared as in Example 1. Prewet sample 5-gram pieces comprised of Fibers B, C, D, E, silk and mohair, respectively, are dyed, one piece in each dye bath, using the procedure of Example 1. In each dyeing, the dye bath again is substantially exhausted by the time the bath temperature reaches 160° F. The dyed pieces are unevenly colored and the dyeing is commercially unacceptable.

EXAMPLE 4

Ten dye baths are prepared, each containing 250 ml. of water, 150 mg. of 28% aqueous acetic acid and 50 mg. respectively (1% OWF) of one of the following dyes:

(a) Acid Brown 19 (premetalized neutral-dyeing)
(b) Acid Black 6 (premetalized neutral-dyeing)
(c) Acid Blue 165 (premetalized neutral-dyeing)
(d) Acid Black 26A (a milling dye)
(e) Acid Green 16 (a milling dye)
(f) Acid Orange 49 (a milling dye)
(g) Acid Red 89 (a milling dye)
(h) Acid Red 151 (a milling dye)
(i) Acid Red 99 (a milling dye)
(k) Disperse Blue 3 (a disperse dye)

In the preparation of each bath, the dye and the ammonium acetate are each first added to part of the water before addition to the bath. Each of the baths has a pH slightly below six. Ten sample 5-gram pieces comprising Fiber A are then prewet with water, the excess water removed, and one wet piece entered into each of the ten dye baths at room temperature. Again dyeings are carried out as in Example 1, heating slowly (with stirring) to the boil in about 45 minutes and then dyeing at the boil for about 45 minutes. In each case the dyes exhaust very rapidly. The dyed pieces are then rinsed and dried. In each of case (a) to (i) the dyed pieces are unlevel and would be commercially unacceptable. In case (k) the desired dye value is not obtained.

Although unsatisfactory results were obtained in each of the preceding Examples 1–4, the unexpectedly improved results obtainable according to this invention are clearly shown in the following examples. In each is employed a dyeing assistant as required in the procedure of the present invention. For these examples, several dyeing assistant compositions were prepared. They are designated as Assistants "A" to "E" respectively. In each the (N–1) component is a condensation product of one mol of nonyl phenol and nine mols of ethylene oxide; the (N–2) component is a condensation product of 4 parts by weight of polyoxyethylene with one part of polyoxypropylene; and the (A–1) component is a mixed amyl naphthalene sodium sulfonate.

Dyeing Assistant "A" is prepared as follows: About 25 parts of (N–1) and 6.25 parts of (A–1) are stirred together and then slowly heated to about 180° F. About 25 parts of (N–2) is added to about 44 parts of water, after which the hot mixture of (N–1) and (A–1) is added to the aqueous (N–2) solution. The resulting mixture is then heated to the boil with stirring and boiling and stirring is continued until the mixture is uniform. The heat source is removed and slow stirring is continued until the composition has cooled to about 25° C. The resultant cooled composition is a clear, amber-colored, viscous, slightly-thixotropic liquid having a pH of about 7.

Additional dyeing assistant compositions are prepared using the same procedure and materials. Again all parts are by weight.

| Assistant | "B" parts | "C" parts | "D" parts | "E" parts |
|---|---|---|---|---|
| (N-1) | 18.75 | 18.75 | 18.75 | 25.00 |
| (A-1) | 18.75 | 18.75 | 18.75 | |
| (N-2) | 12.50 | 18.75 | 25.00 | 25.00 |
| Water | 50.00 | 43.75 | 37.50 | 50.00 |

EXAMPLE 5

Three 250-ml. dye baths are prepared, each containing 50 mg. of Acid Red 182 and 150 mg. ammonium acetate. To the first bath is added 25 mg. Dyeing Assistant "A" (0.5% OWF); to the second is added 50 mg. of "A" (1% OWF); and to the third is added 100 mg. of "A" (2% OWF). Before addition to the bath, the assistant is diluted with about 5 ml. of the dye-bath water. Sample 5-gram wool pieces are prewet with water, the excess water removed, and a wet piece is entered into each bath. Dyeing is carried out as in Example 1. The final pH of the dye bath is about 5.6 in each case. The dye exhausts much more slowly than in Example 1. The dyeings are stronger, more level, free of skittery or heathery effects, and are commercially acceptable. The improvement in levelness of the shade of the dyed pieces increases as the amount of Assistant "A" is increased. In this example, the greatest improvement occurs between the 0.5% and 1.0% baths. On increase to 2% a proportionately smaller increase in levelness is obtained.

EXAMPLE 6

A dye bath is prepared as in Example 5, but adding thereto about 50 mg. (1% OWF) of Assistant "A." A sample 5-gram piece of the same Fiber A material used in Example 2 is dyed in this bath, following the dyeing procedure of Example 2. The dyed piece has a strong, solid shade, it free from Barré marks and the dyeing is commercially acceptable.

EXAMPLE 7

Five additional dye baths are prepared as in Example 6, each containing about 50 mg. (1% OWF) of one of Assistants "A," "B," "C," "D" and "E." A sample 5-gram wool piece is then dyed in each using the procedure of Example 1. In each case an improved result as compared with Example 1 is obtained. However, as compared with Assistants "A" to "D," Assistant "E" produced a markedly smaller improvement, the resultant dyeing being barely acceptable. Assistants "A" to "D" inclusive, each caused good, solid, level shades commercially acceptable to be obtained.

EXAMPLE 8

One percent of Assistant "A" is added to 250 ml. water, and a 5-gram piece of woolen fabric is thoroughly wet with this solution. The excess is squeezed back into the bath and to the bath is added 50 mg. of Acid Red 182 and 150 mg. ammonium acetate. The prewet woolen piece is then returned to the bath and dyed by the procedure of Example 1. A strong level shade is obtained which is free from heathery or skittery effects and is commercially acceptable.

EXAMPLE 9

The procedure of Example 8 is repeated substituting 100 mg. of 28% aqueous acetic acid instead of the 150 mg. of ammonium acetate. The initial pH of this dye bath is about 5.6, and the final pH about 5.7. The dye in the bath exhausts onto the fiber more rapidly than in Example 8. Even when the dyeing cycle is shortened by 30 minutes, the piece is well dyed a solid level shade, is well penetrated by the dye and the dyeing is of acceptable quality.

EXAMPLE 10

Example 9 is repeated adding 25 mg. ammonia to the dye bath, giving an initial pH of about 8.4 and a terminal pH of about 5.6. The piece is dyed a strong, level shade which is well penetrated and the dyeing is of acceptable quality.

EXAMPLE 11

Ten 250-ml. baths are prepared each containing 50 mg. Dyeing Assistant "A," and 50 mg. acetic acid, 28% (1% OWF). To each bath is added one of the ten dyes, respectively, of Example 4. Ten 5-gram pieces of wool are prewet with water, the excess water removed, and one piece of wetted wool added to each dye bath and dyeing is done according to the dyeing cycle of Examples 1 and 4. The terminal pH of each bath is below six. Each of the pieces is dyed a solid, level shade; free from skittery or heathery effects and the dyeing is of commercially acceptable quality.

EXAMPLE 12

Five dye baths are prepared, each containing 250 ml. water 50 mg. Dyeing Assistant "A," 50 mg. Acid Red 182, and 50 mg. acetic acid, 28%. Five-gram pieces of material consisting, respectively, of Fibers B, C, D, E, and silk are dyed, one piece in each bath, using the dyeing procedure of Example 1. All the dyed pieces have good solid shades, are well penetrated, and are of commercially acceptable quality.

Using the same procedure and materials set forth above in describing the prepartion of Dyeing Assistant "A," two additional dyeing-assistant compositions were prepared. Their content of the essential ingredients are shown as follows. Again all parts are by weight.

| Assistant | "F" | "G" |
|---|---|---|
| (N-1) | 12.50 | 25.00 |
| (A-1) | 12.50 | 5.00 |
| (N-2) | 31.25 | 25.00 |
| Water | 43.75 | 45.00 |

EXAMPLE 13

Three 250-ml. dye baths are prepared each containing 50 mg. Acid Orange 54 and 150 mg. ammonium acetate. The first bath contains no dyeing assistant, the second bath contains 100 mg. of Dyeing Assistant "F" and the third bath contains 100 mg. of Dyeing Assistant "G." Five-gram wool pieces are dyed by the dyeing procedure of Example 1. The piece dyed in the first bath is unevenly dyed and the dyeing is commercially unacceptable. The pieces dyed in the second and third baths have solid, level shades and the dyeings are commercially acceptable in quality.

In the foregoing discussion, a number of dyes of each of the three classes with which the invention is concerned have been discussed and/or tested. It is not intended the invention be limited thereto, other dyes of these classes being also useful in the practice of the present invention. In addition to those previously mentioned other illustrative dyes of the several types includes but are not limited to the following.

In addition to those dyes discussed above, the following dyes may be used in the practice of this invention:

*Milling dyes*

| | |
|---|---|
| Acid Black 33 | Acid Red 124 |
| Acid Blue 113 | Acid Red 132 |
| Acid Blue 114 | Acid Red 152 |
| Acid Green 9 | Acid Red 173 |
| Acid Green 19 | Acid Violet 49 |
| Acid Orange 45 | Acid Violet 72 |
| Acid Orange 59 | Acid Yellow 40 |
| Acid Orange 83 | Acid Yellow 44 |
| Acid Red 85 | Acid Yellow 63 |
| Acid Red 86 | Acid Yellow 82 |
| Acid Red 97 | Acid Yellow 117 |

Neutral-dyeing premetallized dyes

| | |
|---|---|
| Acid Black 58 | Acid Orange 64 |
| Acid Blue 166 | Acid Red 178 |
| Acid Blue 168 | Acid Red 219 |
| Acid Brown 29 | Acid Violet 68 |
| Acid Brown 47 | Acid Violet 78 |
| Acid Green 43 | Acid Yellow 113 |
| Acid Orange 60 | Acid Yellow 114 |

Disperse Dyes

| | |
|---|---|
| Disperse Black 1 | Disperse Orange 3 |
| Disperse Black 2 | Disperse Orange 7 |
| Disperse Black 3 | Disperse Red 1 |
| Disperse Black 6 | Disperse Red 13 |
| Disperse Black 9 | Disperse Red 15 |
| Disperse Blue 7 | Disperse Red 31 |
| Disperse Blue 16 | Disperse Yellow 3 |
| Disperse Blue 33 | Disperse Yellow 5 |
| Disperse Green 1 | |

We claim:

1. A liquid dyeing-assistant composition having a pH of from about six to about eight and consisting essentially of:
   (a) at least about 23 weight percent of water;
   (b) as a first nonionic agent, from about 2.7 to about 40 weight percent of at least one alkyl aryl polyether alcohol surface-active agent, said alkyl aryl polyether alcohol being derived from an alkyl phenol and ethylene oxide in mol ratio of from about 1:6 to about 1:10;
   (c) as a second nonionic agent, from about 2.7 to about 40 weight percent of at least one polyoxylalkylene surface-active agent having an apparent molecular weight of from about 8,000 to about 9,000 and being a condensation product derived from polyoxypropylene and polyoxyethylene in which the weight ratio of polyoxypropylene to polyoxyethylene is from about 1:2 to about 1:5; and
   (d) as an anionic agent, from about 0.8 to about 20 weight percent of at least one sulfonated alkylnaphthalene surface-active agent, the alkyl substituent having from about four to about eight carbon atoms; the ratio of the total weight of said nonionic agents to said anionic agent ranging from about 1:5 to 1 to about 10 to 1, the total content of nonionic surface-active agents comprising from about eight to about sixty weight percent of the composition.

2. A composition according to claim 1 in which said alkyl substituent on the phenol in said first nonionic agent contains from about six to about ten carbon atoms.

3. A composition according to claim 1 in which said first nonionic agent is derived from nonylphenol and ethylene oxide in mol ratio of from about one to about nine.

4. A liquid dyeing-assistant composition according to claim 1 in which:
   said second nonionic agent is a condensation product derived from polyoxypropylene and polyoxyethylene in the weight ratio of polyoxypropylene to polyoxyethylene of from about 1:2 to about 1:5, said polyoxypropylene having an apparent molecular weight of from about 1500 to about 1800.

5. A process for the preparation of a composition according to claim 1 comprising the steps of; mixing said first nonionic agent and an alkali metal salt of said sulfonated alkyl naphthalene at ambient room temperature; stirring and heating the resultant mixture to a temperature of from about 160° F. to about 190° F. until a uniform liquid composition is obtained; dissolving said second nonionic agent in water to obtain a uniform aqueous solution; adding said uniform liquid composition to said aqueous solution with stirring; heating the resultant aqueous mixture to the boiling point with stirring; continuing said heating and stirring until a uniform aqueous solution again is obtained; then stopping said heating and continuing said stirring until the temperature of said uniform aqueous solution has substantially ceased to decrease.

6. A process according to claim 5 in which the mixture of said first nonionic agent and said sulfonated alkyl naphthalene salt is heated to a temperature of from about 175° to about 185° C.

References Cited in the file of this patent

UNITED STATES PATENTS

| | | |
|---|---|---|
| 1,372,038 | Phair | Mar. 22, 1921 |
| 2,133,282 | Cook et al. | Oct. 18, 1938 |
| 2,305,691 | Grossmann | Dec. 22, 1942 |
| 2,524,041 | Cook et al. | Oct. 3, 1950 |
| 2,614,084 | Caesar et al. | Oct. 14, 1952 |
| 2,630,411 | Harris | Mar. 3, 1953 |
| 2,642,400 | Harris | June 16, 1953 |
| 2,674,619 | Lundsted | Apr. 6, 1954 |
| 2,759,869 | Sutton et al. | Aug. 21, 1956 |
| 2,920,045 | Hearn et al. | Jan. 5, 1960 |
| 2,977,315 | Scheib et al. | Mar. 28, 1961 |

OTHER REFERENCES

Sisley: "Nonionic Compounds, Their Employment in the Textile Industry," in American Dyestuff Reporter, vol. 38, No. 14, July 11, 1949, 8–83 (pp. 517–8).

Diserens: "Chemical Technology of Dyeing and Printing," vol. II, Reinhold Publ. Corp., N.Y. (copyright 1951) (pp. 326–327).

"Antara Chemicals Catalogue," published by Antara Chem., New York, 1953, pp. 11–12 and 25–26.

"Pluronics," published by Wyandotte Chemicals Corp., 1958, pp. 8–9.

UNITED STATES PATENT OFFICE
CERTIFICATE OF CORRECTION

Patent No. 3,167,517                          January 26, 1965

Henry E. Millson et al.

It is hereby certified that error appears in the above numbered patent requiring correction and that the said Letters Patent should read as corrected below.

Column 2, line 9, for ".ie.," read -- i.e., --; column 4, line 46, for "polyester" read -- polyether --; column 9, line 38, for "it" read -- is --; column 10, line 21, after "water" insert a comma; line 58, for "includes" read -- include --; column 11, line 33, for "polyoxylalkylene" read -- polyoxyalkylene --.

Signed and sealed this 1st day of June 1965.

(SEAL)
Attest:

ERNEST W. SWIDER                          EDWARD J. BRENNER
Attesting Officer                            Commissioner of Patents